United States Patent [19]

Gerloff et al.

[11] Patent Number: 4,666,392
[45] Date of Patent: May 19, 1987

[54] RAISABLE EXTRUDER HEAD FOR EXTRUDERS

[75] Inventors: Klaus Gerloff, Isernhagen; Hans Menell, Hanover; Ludolf Bark, Garbsen; Friedrich Klöpper, Barsinghausen; Gerhard de Vries, Garbsen, all of Fed. Rep. of Germany

[73] Assignee: Continental Gummi-Werke Aktiengesellschaft, Hanover, Fed. Rep. of Germany

[21] Appl. No.: 733,212

[22] Filed: May 10, 1985

[30] Foreign Application Priority Data

May 19, 1984 [DE] Fed. Rep. of Germany ....... 3418766
Jun. 27, 1984 [DE] Fed. Rep. of Germany ....... 3423678

[51] Int. Cl.$^4$ .................. B29C 47/12; B29C 47/22
[52] U.S. Cl. ................. 425/190; 425/131.1; 425/466
[58] Field of Search ............. 425/190, 192 R, 466, 425/131.1

[56] References Cited

U.S. PATENT DOCUMENTS

| 3,902,835 | 9/1975 | Theysohn | 425/188 |
| 4,124,346 | 11/1978 | Greenwood | 425/188 |
| 4,137,027 | 1/1979 | Rüger et al. | 425/133.5 |
| 4,316,710 | 2/1982 | Greenwood | 425/190 |
| 4,548,568 | 10/1985 | Herbert et al. | 425/188 |

*Primary Examiner*—Willard E. Hoag
*Attorney, Agent, or Firm*—Becker & Becker

[57] ABSTRACT

An extrusion die having pivotally mounted parts disposed at the die outlet and pivotal locking members for latching the pivotal parts closed.

11 Claims, 3 Drawing Figures

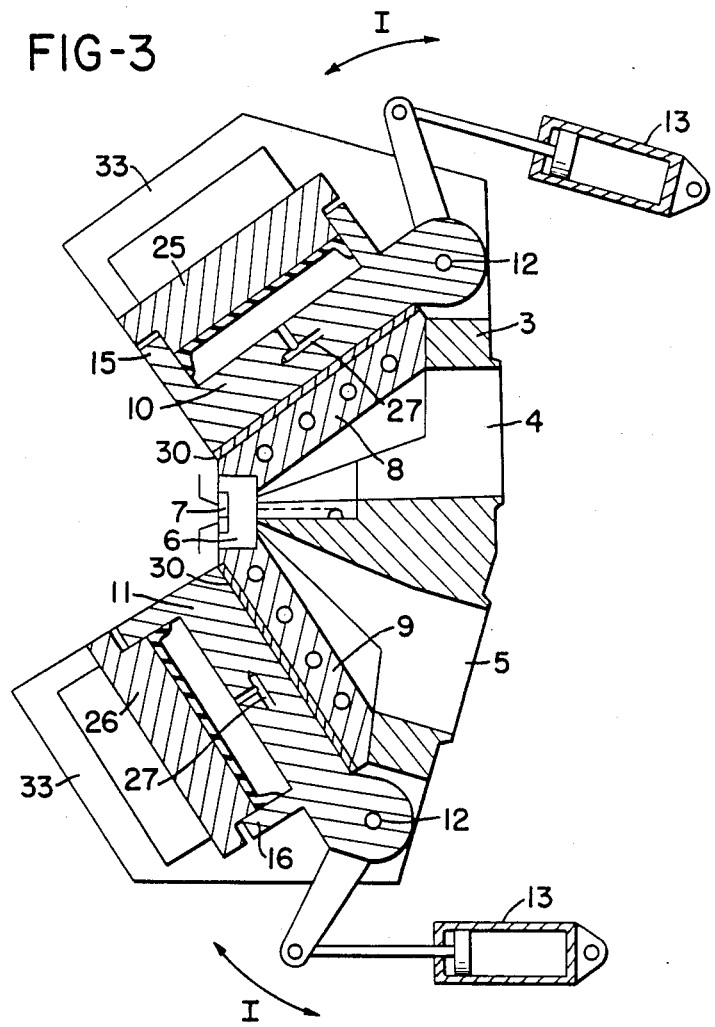

RAISABLE EXTRUDER HEAD FOR EXTRUDERS

BACKGROUND OF THE INVENTION

1. Field of the Invention

The present invention relates to a raisable extruder head for extruders for shaping plastic mixtures of rubber or synthetic material; the extruder head includes parts which are pivotable about fixed points on the extruder head between a closed position and an open position, and which can be pressed against the extruder head, in the closed position, ahead of an interchangeable extruder nozzle.

2. Description of the Prior Art

Extruders having such extruder heads are used, for example, for manufacturing the uncured tread strips of pneumatic vehicle tires, or for other profiled articles having a flat, elongated cross-sectional shape, with such articles having either a homogeneous composition, or a multi-component construction. Free accessibility to the flow channels which lead to the extruder nozzle is usually required, so that each time that the mixture which is being processed is changed, these flow channels can be exposed and all residue can be thoroughly cleaned therefrom. By embodying the extruder heads in such a way that they can be opened, this requirement ia satisfied. For a sealing engagement of the extruder head parts, which form the wall of the flow channels and are movable relative to one another, heretofore known proposals provided for mechanical clamps or even hydraulically operated wedge-type slides which run up on inclined surfaces. In either case, due to the interaction of the interior material pressure, and due to the exterior closing forces, high bending moments are applied to the clamped or closed extruder head parts, and since even only slight gaps of an order of magnitude of a few hundredths of a millimeter between the sealing surfaces allow extrusion material to issue from the flow channels, the pertaining parts have to be made as rigid as possible. However, this leads to disproportionately heavy constructions of the extruder heads, accompanied by the drawbacks of heavy weight and high manufacturing costs, as well as impediments, caused by the geometry of the dimensioning, to the accessibility of the flow channels, thus making it more difficult to clean the latter.

An object of the present invention is to obtain a desired free accessibility to the channels which convey the extrusion material via a novel design of the extruder head, which can be opened, on extruders with a relatively light and simple construction.

BRIEF DESCRIPTION OF THE DRAWINGS

This object, and other objects and advantages of the present invention, will appear more clearly from the following specification in conjunction with the schematic drawings, in which:

FIG. 3 is a view showing an axial section of a further inventively modified extruder head.

SUMMARY OF THE INVENTION

Figure 1:
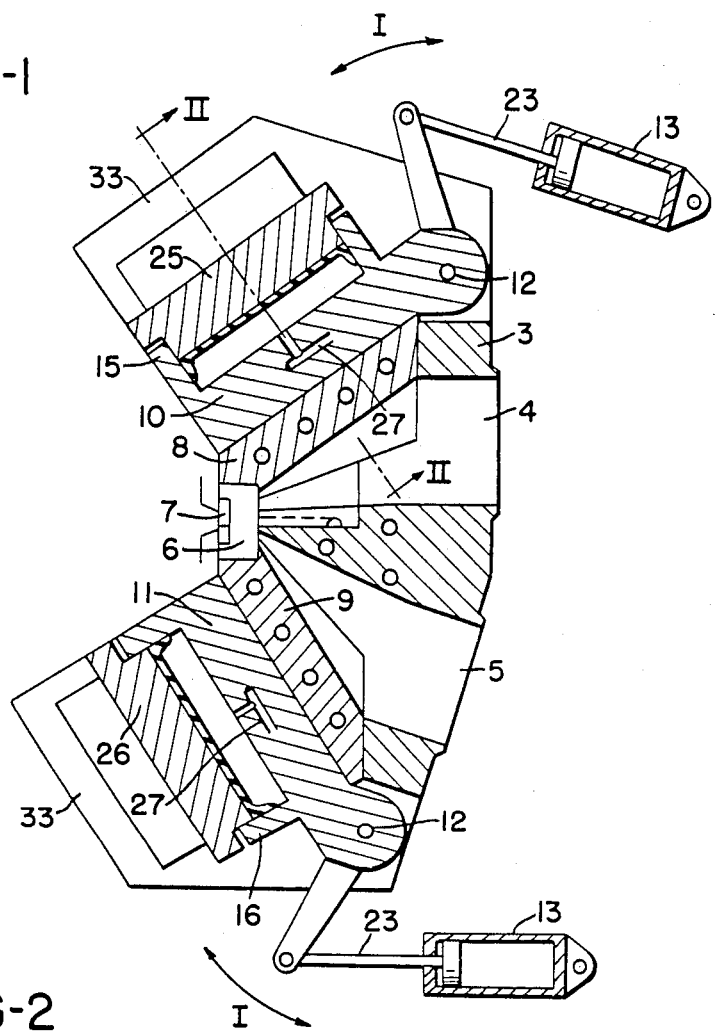
FIG. 1 is a view showing an axial section of the front portion of one inventive embodiment of a raisable extruder head for an extruder.

The extruder head of the present invention is characterized primarily in that in the closed state, each of the pivotable extruder head parts bears against the extruder head by means of a respective elastically yieldable spring element.

Pursuant to important specific features of the present invention, the spring elements can be detachably connected to the extruder head, and can be embodied as single-chamber pressure medium cylinders, the free cross-sectional areas of which essentially or nearly correspond to the size of that inner surface of the respectively associated extruder head part which receives extrusion material. Furthermore, this free cross-sectional area can also be essentially or nearly congruent to said inner surface of the associated extruder head part. In connection with these features, the pressure of the pressure medium in the cylinders is advantageously regulated as a function of the static pressure of the extrusion material within the extruder head.

The first consequence of the present invention is a continuous, precise conformation of the closure forces, which act upon the movable parts of the extruder head, to the varying operating conditions which exist at any given time. Thus, oversized extruder heads, along with the resulting unnecessary weight and cost encumbrances, can be avoided at the outset. The present invention also has the particular advantage that harmful pressure peaks caused by automatic temporary opening are already prevented before plastic deformations or material failures occur. As a result, a frequent cause of damage, and hence the otherwise unavoidable necessity for constant maintenance, are eliminated.

Pursuant to a further specific embodiment of the present invention, the pressure medium cylinders, which serve as the spring elements, are thermally insulated relative to the pivotable parts of the extruder head. Those outer surfaces of the pivotable extruder head parts which face the associated pressure medium cylinder, or alternatively those inner surfaces of the extruder head parts which receive extruder material, can be provided with a coating or layer of a material having a poor thermal conductivity. It is also within the scope of the present invention to utilize both of these alternative features at the same time.

These latter inventive features of the extruder head result not only in a per se known thermal insulation for preventing heat losses. Rather, under the prescribed specific starting conditions, the important advantage is the shielding of the pressure medium cylinders against uncontrolled thermal convection influences. This fact is of particular significance for hydraulic systems, because the normal hydraulic fluids tend to decompose and form vapor bubbles under the effect of high temperatures, which can be the cause of often unexplainable malfunctions of the pressure cylinders operated therewith. By properly recognizing the causal connections, the present invention, with relatively simple means, provides a remedy, which is effective even during extended operation of the extruders, against the disturbances caused by the thermal processes in the region of the extruder head, and thus fulfills all requirements for successful utilization of the pressure medium cylinders which are provided.

Suitable materials having a poor thermal conductivity, which at the same time, however, satisfy the requirements for high strength, are, for example, tantalum alloys. However, the present invention is not limited to any particular type of material.

DESCRIPTION OF PREFERRED EMBODIMENTS

Referring now to the drawings in detail, the extruder head 3 illustrated in FIG. 1 forms the termination and shape-giving output part of a complete unit composed of two screw extruders, which are not shown in detail. The different mixture flows conveyed from the two extruders via separate channels 4 and 5 flow together in a common preform die 6, from where they are continuously extruded, through an interchangeable nozzle 7, as a uniform, cohesive profiled article. The front portion of the outer walls of the flow channels 4, 5 run into the preform die 6 at an angle and comprise movable plates 8 and 9. These plates are rigidly mounted on pivot arms 10, 11, with which they can be pivoted, into an open position, about pivot pins 12 connected with the extruder head 3, out of the illustrated sealing end position in the direction of the double-headed arrow I. The purpose of this open position is to expose the flow channels 4, 5, for example in order to permit cleaning thereof. To pivot the plates 8, 9, hydraulic adjusting cylinders 13 are provided, the retractable and extensible piston rods 23 of which are hinged to the pivot arms 10, 11.

In the closed condition of the extruder head 3, the pivotable plates 8, 9 bear against the latter via single-chamber pressure medium cylinders 15, 16 in which are sealingly disposed pistons 25, 26. The closed bottoms of the cylinders 15, 16 are either fixedly connected to the pivot arms 10, 11, or, as in the illustrated embodiment, are integrally manufactured therewith. On the other hand, the pistons 25, 26, which are movable over only relatively short strokes, have a loose frictional connection with frame elements 33 of the extruder head 3. Via a bore 27 in the pivot arms 10, 11, and via nonillustrated external connecting lines, pressure medium can be supplied to the working chamber of the cylinders 15, 16; in this way, a hydraulic cushion is incorporated into the arresting of the plates 8, 9. The magnitude of the introduced fluid pressure is expediently regulated as a function of the static pressure of the extrusion mass existing in the flow channels 4 and 5.

Figure 2:
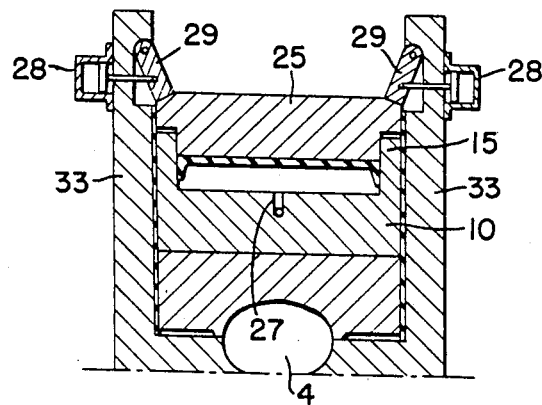
FIG. 2 is a sectional view taken along the line II—II in FIG. 1.

In the closed state of the extruder head 3, with sealingly abutting plates 8, 9, the pistons 25, 26, one side of which is stressed by the pressure within the cylinders, rest frictionally against the frame elements 33 by means of movable pins or push members 29 (FIG. 2). These pins are pivotably connected to the frame elements 33, and can, with the aid of associated adjusting cylinders 28, be pivoted back out of the illustrated position of use into a position of rest in order, for purposes of inspection and maintenance, to make it possible to obtain free access to the pistons 25, 26 and the cylinders 15, 16.

The extruder head illustrated in FIG. 3 differs from the embodiment of FIGS. 1 and 2 merely in that insulating plates 30 are disposed between the plates 8, 9 and the pivot arms 10, 11, which form the bottom of the cylinders 15, 16. These insulating plates 30 are made of a tantalum alloy, or of some other high-strength material having poor thermal conductivity. The insulating plates 30 are placed upon the outer surfaces of the plates 8, 9 in the form of thin sheets; they eliminate the conveying of heat by convection from the heated parts of the extruder head to the cylinders 15, 16, and prevent the thermal influence of the pressure medium in the hydraulic system of the cylinders 15, 16, which thermal influence diminishes the desired cushion effect. In other respects, the construction and method of operation of the extruder head illustrated in FIG. 3 correspond to those described in connection with the embodiment of FIGS. 1 and 2.

The present invention is, of course, in no way restricted to the specific disclosure of the specification and drawings, but also encompasses any modifications with the scope of the appended claims.

What we claim is:

1. An extruder head having pivotable head parts consisting of two parts movable relative to each other for extruders for shaping plastic mixtures of rubber or synthetic extrusion material; said parts being pivotable, about fixed points on said extruder head, between a closed position and an open position, and being arrested tightly pressed against said extruder head, in said closed position, ahead of an interchangeable extruder nozzle; the improvement in combination therewith which comprises:

pivotally mounted latching member and a respective elastically yieldable spring element integrated in the extruder head and consequently subject to heat influence upon which elastic yieldability depends for each of said pivotable extruder head parts, with the latter bearing against said extruder head and said member being movable pivotally into engagement with one of said pivotable head parts to lock said one of said head parts closed position, so that oversized extruder head configuration can be avoided while a continuous, precise comformation of closure forces acting upon said movable parts of the extruder heads occurs relative to varying operating conditions which exist at any given time and furthermore harmful pressure peaks caused by extrusion material pressure variable directly against one of said parts subject to automatic temporary opening are already prevented before any plastic deformations and material failues occur.

2. An extruder head in combination according to claim 1, in which said spring elements are detachably connected with said extruder head.

3. An extruder head in combination according to claim 2, in which each of said spring elements is a single-chamber pressure medium cylinder.

4. An extruder head in combination according to claim 3, in which each of said pressure medium cylinders has a free cross-sectional area which receives pressure medium and corresponds at least nearly in size to an inner surface, of the associated extruder head parts, which receives extrusion material.

5. An extruder head in combination according to claim 4, in which said free cross-sectional area of a given pressure medium cylinder is at least nearly congruent to said inner surface of the assoicated extruder head part.

6. An extruder head in combination according to claim 5, in which the pressure of pressure medium in said cylinders is regulated as a function of the static pressure of extrusion material within said extruder head.

7. An extruder head in combination according to claim 6, which includes means for thermally insulating said pressure medium cylinders relative to said pivotable extruder head parts.

8. An extruder head in combination according to claim 7, in which each of said pivotable extruder head parts has an outer surface directed toward its associated pressure medium cylinder, with said outer surfaces being provided with a layer of material-having lower thermal conductivity.

9. An extruder head in combination according to claim 8, in which each of said inner surfaces of said pivotable extruder head parts is provided with a layer of tantalum alloy material having reduced thermal conductivity.

10. An extruder head in combination according to claim 7, in which each of said inner surfaces of said pivotable extruder head parts is provided with a layer of tantalum alloy material having reduced thermal conductivity.

11. An extruder head having pivotable head parts consisting of two parts movable relative to each other for extruders for shaped plastic mixtures of rubber of synthetic extrusion material; said parts being pivotable, about fixed points on said extruder head, between a closed position and an open position, and being arrested tightly pressed against said extruder head, in said closed position, ahead of an interchangeable extruder nozzle; the improvement in combination therewith which comprises:

a pivotally mounted latching member and a respective elastically yieldable spring element detachably connected with said extruder head although integrated therein and consequently subject to heat influence upon which elastic yieldability depends for each of said pivotable extruder head parts, with the latter bearing against said extruder head said member being movable pivotally into engagement with one of said pivotable head parts to lock said one of said head parts in said closed position, via elastically yieldable spring elements so that oversized extruder head configuration can be avoided while a continuous, precise conformation of closure forces acting upon said movable parts of the extruder head occurs relative to varying operating conditions which exist at any given time and furthermore harmful pressure peaks caused by extrusion material pressure variable directly against one of said parts subject to automatic temporary opening are already prevented before any plastic deformations and material failures occur.

* * * * *